(12) United States Patent
Gui (10) Patent No.: US 11,039,299 B2
(45) Date of Patent: Jun. 15, 2021

(54) ESIM CARD ACTIVATION METHOD, WIRELESS ROUTER, AND USER TERMINAL

(71) Applicant: Huawei Technologies Co., Ltd., Shenzhen (CN)

(72) Inventor: Yonglin Gui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/479,115

(22) PCT Filed: May 20, 2017

(86) PCT No.: PCT/CN2017/085235
§ 371 (c)(1),
(2) Date: Jul. 18, 2019

(87) PCT Pub. No.: WO2018/133271
PCT Pub. Date: Jul. 26, 2018

(65) Prior Publication Data
US 2019/0387396 A1    Dec. 19, 2019

(30) Foreign Application Priority Data

Jan. 18, 2017 (CN) .......................... 201710036805.5

(51) Int. Cl.
*H04W 8/26* (2009.01)
*H04W 76/34* (2018.01)
(Continued)

(52) U.S. Cl.
CPC .............. *H04W 8/20* (2013.01); *H04W 4/80* (2018.02); *H04W 8/183* (2013.01); *H04W 8/265* (2013.01);
(Continued)

(58) Field of Classification Search
CPC ....... H04W 8/265; H04W 76/14; H04W 4/80; H04W 8/20; H04W 76/34; H04W 12/068;
(Continued)

(56) References Cited

U.S. PATENT DOCUMENTS

2014/0036873 A1 * 2/2014 Cheng ............... H04W 36/0033
370/331
2017/0156051 A1 6/2017 Park et al.
(Continued)

FOREIGN PATENT DOCUMENTS

CN          103476092 A     12/2013
CN          105071824 A     11/2015
(Continued)

OTHER PUBLICATIONS

Machine Translation and Abstract of Chinese Publication No. CN105554687, May 4, 2016, 31 pages.
(Continued)

*Primary Examiner* — Omer S Mian
(74) *Attorney, Agent, or Firm* — Conley Rose, P.C.

(57) ABSTRACT

An ESIM card activation method includes receiving, by the wireless router by using a near field communication module, a configuration file that is used to activate an ESIM card and that is sent by a user terminal. The method further includes installing, by the wireless router, the configuration file to complete ESIM card activation. The method further includes establishing, by the wireless router, a first wireless network by using the activated ESIM card.

20 Claims, 4 Drawing Sheets

(51) Int. Cl.

| | | |
|---|---|---|
| *H04W 76/14* | (2018.01) | |
| *H04W 4/80* | (2018.01) | |
| *H04W 12/06* | (2021.01) | |
| *H04W 12/33* | (2021.01) | |
| *H04W 12/30* | (2021.01) | |
| *H04W 8/20* | (2009.01) | |
| *H04W 12/45* | (2021.01) | |
| *H04W 12/069* | (2021.01) | |
| *H04W 8/18* | (2009.01) | |

(52) U.S. Cl.
CPC ....... *H04W 12/068* (2021.01); *H04W 12/069* (2021.01); *H04W 12/33* (2021.01); *H04W 12/35* (2021.01); *H04W 12/45* (2021.01); *H04W 76/14* (2018.02); *H04W 76/34* (2018.02)

(58) Field of Classification Search
CPC ..... H04W 12/35; H04W 12/33; H04W 8/183; H04L 9/0861
See application file for complete search history.

(56) References Cited

U.S. PATENT DOCUMENTS

| | | | |
|---|---|---|---|
| 2018/0063668 A1* | 3/2018 | Li | H04L 9/14 |
| 2019/0150093 A1* | 5/2019 | Kweon | H04W 40/244 370/311 |
| 2019/0221106 A1* | 7/2019 | Wengrovitz | G08B 25/14 |
| 2020/0162893 A1* | 5/2020 | Park | H04W 8/20 |

FOREIGN PATENT DOCUMENTS

| | | |
|---|---|---|
| CN | 105554687 A | 5/2016 |
| CN | 106162828 A | 11/2016 |
| CN | 205793403 U | 12/2016 |
| EP | 2903302 A1 | 8/2015 |
| EP | 2986044 A1 | 2/2016 |
| GB | 2522044 A | 7/2015 |
| KR | 20160002326 | 1/2016 |

OTHER PUBLICATIONS

Foreign Communication From a Counterpart Application, PCT Application No. PCT/CN2017/085235, English Translation of International Search Report dated Oct. 12, 2017, 2 pages.
Foreign Communication From a Counterpart Application, PCT Application No. PCT/CN2017/085235, English Translation of Written Opinion dated Oct. 12, 2017, 4 pages.
Machine Translation and Abstract of Chinese Publication No. CN105071824, Nov. 18, 2015, 16 pages.
Foreign Communication From a Counterpart Application, European Application No. 17893013.7, Extended European Search Report dated Dec. 6, 2019, 11 pages.
Machine Translation and Abstract of Chinese Publication No. CN103476092, Dec. 25, 2013, 17 pages.
Machine Translation and Abstract of Chinese Publication No. CN106162828, Nov. 23, 2016, 18 pages.
Machine Translation and Abstract of Chinese Publication No. CN205793403, Dec. 7, 2016, 7 pages.
Foreign Communication From a Counterpart Application, Chinese Application No. 201780005039.4, Chinese Office Action dated Nov. 19, 2019, 7 pages.

* cited by examiner

ESIM CARD ACTIVATION METHOD, WIRELESS ROUTER, AND USER TERMINAL

CROSS-REFERENCE TO RELATED APPLICATIONS

This application is a national stage application of International Application No. PCT/CN2017/085235, filed on May 20, 2017, which claims priority to Chinese Patent Application No. 201710036805.5, filed on Jan. 18, 2017. Both of the aforementioned applications are hereby incorporated by reference in their entireties.

TECHNICAL FIELD

This application relates to the field of wireless router technologies, and in particular, to an ESIM card activation method, a wireless router, and a user terminal.

BACKGROUND

With rapid development of an embedded subscriber identification module (embedded subscriber identification module, ESIM) technology, more devices choose to use an ESIM. Compared with a conventional subscriber identity module (subscriber identity module, SIM), the ESIM is embedded to a chip of a device directly, instead of being present as a separate removable component in the device. In actual application, a user can perform switching between networks of different operators by using software. Although the ESIM is embedded in a device, a network service still needs to be enabled by, for example, binding a mobile phone number, selecting a service package from an operator, or paying fees, so that the user can use this ESIM-enabled device normally.

In a prior-art solution, if a user wants to activate a service for an ESIM-enabled device, one way is to preset a specific configuration file, and but this solution can only be used to access a registration website but cannot be used to perform other data services, that is, the ESIM-enabled device accesses the registration website to complete registration and download a configuration file. However, due to a large quantity of operators, the solution in which the ESIM-enabled device presets a configuration file can only be used for a specific operator or a few operators, and cannot be used globally. Another way is to remotely activate a service for the ESIM-enabled device. Specifically, the ESIM-enabled device needs to first connect to a network through Wireless Fidelity (Wireless Fidelity, Wi-Fi), to obtain a configuration file of the ESIM-enabled device from an operator and install the configuration file in a networked state. However, a service can be activated for the ESIM-enabled device only after the ESIM-enabled device connected to the network. If there is no Wi-Fi available to the ESIM-enabled device or the ESIM-enabled device cannot access to the network through Wi-Fi, a configuration failure problem may occur.

SUMMARY

Embodiments of the present invention provide an ESIM card activation method, a wireless router, and a user terminal, so that when the wireless router is unable to connect to a wireless network, a configuration file used to activate an ESIM card can be received by using a near field communication module, and a user can activate the ESIM card of the wireless router in real time based on a requirement.

According to a first aspect, an embodiment of the present invention provides an ESIM card activation method, where the method is applied to a wireless router supporting an embedded subscriber identification module ESIM card, and the wireless router includes a near field communication module; and the method includes:

receiving, by the wireless router by using the near field communication module, a configuration file that is used to activate the ESIM card and that is sent by a user terminal; installing the configuration file to complete ESIM card activation; and establishing, by the wireless router, a first wireless network by using the activated ESIM card.

According to the first aspect, when the wireless router is unable to connect to a wireless network, the wireless router can receive, by using the near field communication module, the configuration file used to activate the ESIM card, and a user can activate the ESIM card of the wireless router in real time based on a requirement.

In an optional embodiment, the method includes:

when the ESIM card of the wireless router is not activated, disabling, by the wireless router, a Wireless Fidelity Wi-Fi function. This can avoid a case that the configuration file required for activating the ESIM card cannot be transmitted because the user terminal and the wireless router are connected through the inactivated wireless network.

In an optional embodiment, the method includes:

when the ESIM card of the wireless router is not activated, enabling, by the wireless router, a near field communication function by using the near field communication module. Optionally, before the user terminal sends the configuration file, the user terminal and the wireless router establish a connection by using their respective Bluetooth modules, and the connection can be used to transmit data.

In an optional embodiment, the establishing, by the wireless router, a first wireless network by using the activated ESIM card includes:

when the ESIM card of the wireless router is activated, enabling, by the wireless router, the Wi-Fi function, and establishing the first wireless network by using the activated ESIM card.

In an optional embodiment, the method includes:

sending, by the wireless router, a first name and a first password of the established first wireless network to the user terminal, so that the user terminal can connect to the first wireless network by entering the first name and the first password. In this way, a user does not need to query a name and a password of a wireless router, increasing intelligence of the wireless router.

According to a second aspect, an embodiment of the present invention provides another ESIM card activation method, where the method is applied to a user terminal, and the user terminal includes a near field communication module; and the method includes:

obtaining a configuration file used to activate an embedded subscriber identification module ESIM card of a wireless router; and sending, by the user terminal, the configuration file to the wireless router by using the near field communication module.

According to the second aspect, when the wireless router is unable to connect to a wireless network, the wireless router can send, to the wireless router by using the near field communication module, the configuration file used to activate the ESIM card, and a user can activate the ESIM card of the wireless router in real time based on a requirement.

In an optional embodiment, the obtaining, by the user terminal, a configuration file used to activate an embedded subscriber identification module ESIM card of a wireless router includes:

downloading, by the user terminal through a second wireless network or a mobile data network, the configuration file used to activate the ESIM card of the wireless router. Optionally, the wireless router may establish a wireless network, denoted as a first wireless network in this embodiment of the present invention, and the first wireless network has a corresponding first name and a corresponding first password. However; a network accessed by the user terminal is not the first wireless network, but the user terminal may access the network through, including but not limited to, any one of a second wireless network, a mobile data network with which the user terminal is registered, a Wi-Fi hotspot, and the like.

In an optional embodiment, the method further includes:

receiving, by the user terminal, a first name and a first password of a first wireless network that are sent by the wireless router, and connecting to the first wireless network based on the first name and the first password. Optionally, the user terminal may modify the first name and the first password of the first network.

Optionally, if the user terminal connects to a network through a mobile data network before receiving the first name and the first password of the first wireless network that are sent by the wireless router, after the user terminal receives the first name and the first password of the first wireless network that are sent by the wireless router, and connects to the first wireless network based on the first name and the first password, the user terminal disconnects from the mobile data network. This increases intelligence and convenience of the user terminal, and can also avoid data traffic consumption caused when the user terminal uses the mobile data network for activation.

According to a third aspect, an embodiment of the present invention provides a wireless router, where the wireless router supports an embedded subscriber identification module ESIM card, and the wireless router includes a near field communication module; and the wireless router includes:

a receiving unit, configured to receive, by using the near field communication module, a configuration file that is used to activate the ESIM card and that is sent by a user terminal;

an activation unit, configured to install the configuration file to complete ESIM card activation: and an establishment unit, configured to establish a first wireless network by using the activated ESIM card.

In an optional embodiment, the wireless router further includes:

a disabling unit, configured to disable a Wireless Fidelity Wi-Fi function when the ESIM card of the wireless router is not activated.

In an optional embodiment, the wireless router further includes:

an enabling unit, configured to enable, by using the near field communication module, a near field communication function when the ESIM card of the wireless router is not activated.

In an optional embodiment, the establishment unit is specifically configured to: when the ESIM card of the wireless router is activated, enable the Wi-Fi function, and establish the first wireless network by using the activated ESIM card.

In an optional embodiment, the wireless router further includes:

a sending unit, configured to send a first name and a first password of the established first wireless network to the user terminal.

According to a fourth aspect, an embodiment of the present invention provides a wireless router. A structure of the wireless router includes a processor and a transceiver. The transceiver is communicatively connected to the processor, and the processor and the transceiver are configured to execute some or all processes of the ESIM card activation method according to the first aspect. Optionally, the wireless router may further include a memory, where the memory is configured to store application program code or data for the wireless router to perform the method, to implement actions of the wireless router according to the first aspect.

According to a fifth aspect, an embodiment of the present invention provides a user terminal, where the user terminal includes a near field communication module, and the user terminal includes:

an obtaining unit, configured to obtain a configuration file used to activate an ESIM card of a wireless router; and a sending unit, configured to send the configuration file to the wireless router by using the near field communication module.

In an optional embodiment, the obtaining unit is specifically configured to download, through a second wireless network or a mobile data network, the configuration file used to activate the ESIM card of the wireless router.

In an optional embodiment, the user terminal further includes:

a receiving unit, configured to receive a first name and a first password of a first wireless network that are sent by the wireless router; and a connection unit, configured to connect to the first wireless network based on the first name and the first password.

In an optional embodiment, if the user terminal connects to a network through the mobile data network before the receiving unit receives the first name and the first password of the first wireless network that are sent by the wireless router, the user terminal further includes a disconnection unit, configured to disconnect from the mobile data network.

According to a sixth aspect, an embodiment of the present invention provides a user terminal. A structure of the user terminal includes a processor and a transceiver. The transceiver is communicatively connected to the processor, and the processor and the transceiver are configured to execute some or all processes of the ESIM card activation method according to the second aspect. Optionally, the user terminal may further include a memory, where the memory is configured to store application program code or data for the user terminal to perform the method, to implement actions of the user terminal according to the second aspect.

According to a seventh aspect, an embodiment of the present invention provides a storage medium, where the storage medium stores program code, and when the program code is executed by a computing device, the ESIM card activation method according to any one of the first aspect or the implementations of the first aspect is performed.

According to an eighth aspect, an embodiment of the present invention provides a computer program product. When the computer product is executed by a computing device, the ESIM card activation method according to any one of the first aspect or the implementations of the first aspect is performed.

According to a ninth aspect, an embodiment of the present invention provides a storage medium, where the storage medium stores program code, and when the program code is executed by a computing device, the ESIM card activation method according to any one of the second aspect or the implementations of the second aspect is performed.

According to a tenth aspect, an embodiment of the present invention provides a computer program product. When the computer product is executed by a computing device, the ESIM card activation method according to any one of the second aspect or the implementations of the second aspect is performed.

In this embodiment of the present invention, names of the wireless router and the user terminal impose no limitation on the devices. In actual implementation, the devices may have other names, provided that functions of the devices are similar to those in this application, and fall within the scope of the claims and equivalent technologies of this application.

In the embodiments of the present invention, the wireless router receives, by using the near field communication module, the configuration file that is used to activate the ESIM card and that is sent by the user terminal; installs the configuration file to complete the ESIM card activation; and finally establishes the first wireless network by using the activated ESIM card. In this way, when the wireless router is unable to connect to a wireless network, the wireless router can receive, by using the near field communication module, the configuration file used to activate the ESIM card, and a user can activate the ESIM card of the wireless router in real time based on a requirement.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1:
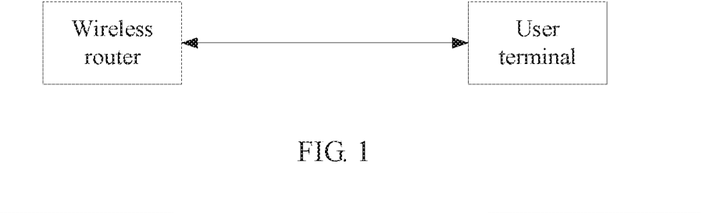
FIG. 1 is a diagram of a system architecture to which this application is applicable according to an embodiment of the present invention.

To facilitate understanding of this application, the following first describes a diagram of a system architecture to which this application is applicable. As shown in FIG. 1, the system architecture diagram includes a wireless router and a user terminal. The wireless router and the user terminal each includes a near field communication module, so that the wireless router and the user terminal can perform data transmission by using the near field communication modules. Further, the wireless router supports an ESIM card. If a first wireless network of the wireless router needs to be used, the ESIM card needs to be activated.

If the wireless router does not have an available wireless network, the wireless router is unable to activate the ESIM card. Alternatively, because a user needs to set basic information of the user, if the wireless router does not have a display screen for performing the operation, the wireless router cannot directly activate the ESIM card even if the wireless router successfully connects to the wireless network. Therefore, according to a prior-art solution, the ESIM card of the wireless router cannot be activated. Further, in this embodiment of the present invention, a specific manner of activating the ESIM card of the wireless router is: The user terminal obtains a configuration file used to activate the embedded user identification module ESIM card of the wireless router, and sends the configuration file to the wireless router by using the near field communication module; and correspondingly, the wireless router receives, by using the near field communication module, the configuration file that is used to activate the ESIM card and that is sent by the user terminal, installs the configuration file to complete ESIM card activation, and finally establishes the first wireless network by using the activated ESIM card. In this way, when the wireless router is unable to connect to a wireless network, the wireless router can receive, by using the near field communication module, the configuration file used to activate the ESIM card, and a user can activate the DAM card of the wireless router in real time based on a requirement.

The wireless router in this embodiment of the present invention may be a carry-on wireless router, or may be a wireless router used in a designated place (such as a company, a home, a store, or a shopping mall). The wireless router is not limited in this embodiment of the present invention.

The near field communication module in this embodiment of the present invention may include but is not limited to a Bluetooth technology, Near Field Communication (Near Field Communication, NFC), and the like. The wireless router is not limited in this embodiment of the present invention. For example, the NFC is a short-range high-frequency wireless communications technology. An NFC system is widely used in the fields such as mobile payment, electronic tickets, and data transmission. A user may implement data transmission with another NFC terminal by using a user terminal that has an NFC function (that is, having an NFC module), such as a mobile phone or a smartwatch. To be specific, the user needs only to put NFC-enabled devices close to each other or at some distance, to implement data communication between the two devices without accessing a network. In addition, the near field communication modules such as a Bluetooth module can also implement data transmission without accessing a network. Details are not described herein.

The user terminal in this embodiment of the present invention may include various handheld devices, in-vehicle devices, wearable devices, and computing devices that have a communication function of the near field communication module, including but not limited to a mobile phone, a tablet computer (Pad), a smart wearable device (such as a smartwatch or a smart band), a cellular phone (cellular phone), a smart phone (smart phone), a personal digital assistant (personal digital assistant, PDA) computer, a handheld (handheld) device, a laptop computer (laptop computer), a cordless phone (cordless phone), a wireless local loop (wireless local loop, WLL) station, a machine type communication (machine type communication, MTC) terminal, and the like. The user terminal may also be referred to as a mobile station (mobile station, MS), a terminal, a terminal equipment (terminal equipment), a subscriber unit (subscriber unit), or the like. For ease of description, in all embodiments of the present invention, the foregoing devices are collectively referred to as a user terminal.

Figure 2:
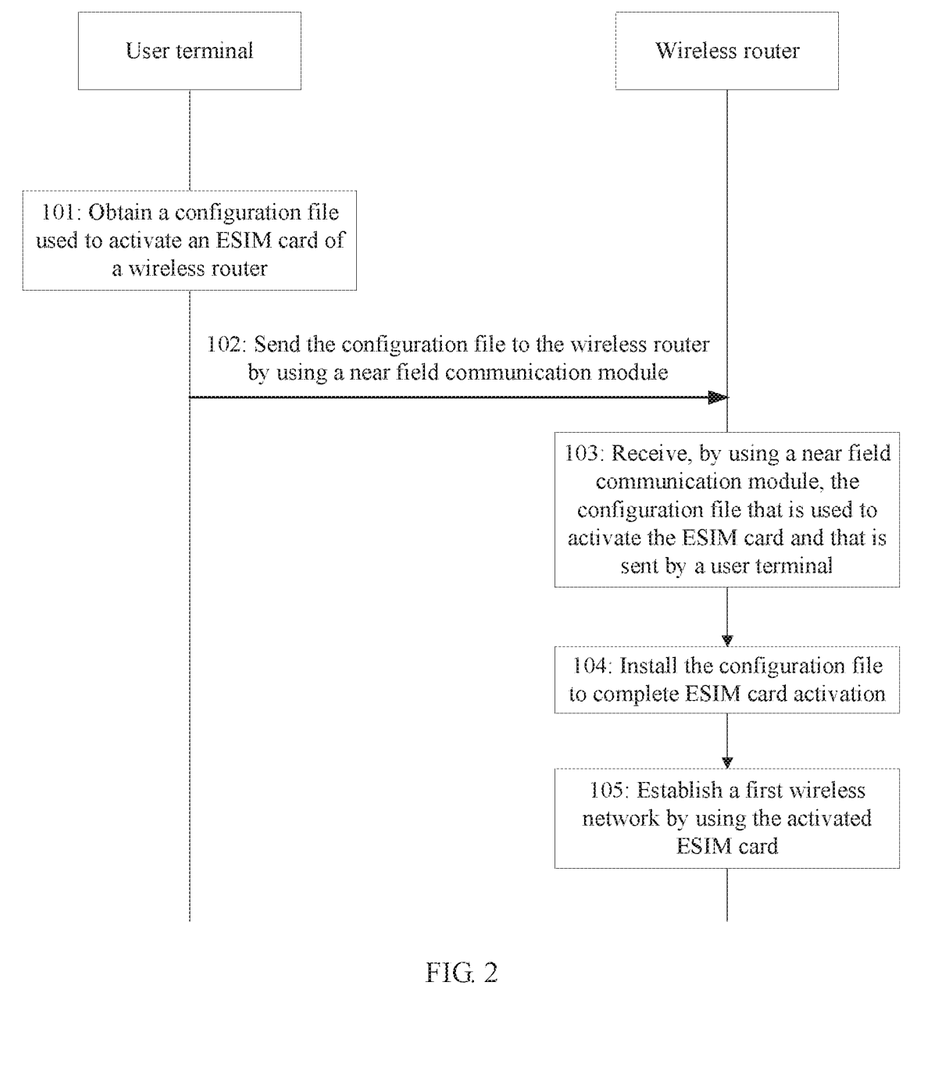
FIG. 2 is a schematic flowchart of an ESIM card activation method according to an embodiment of the present invention.

Based on the system architecture diagram shown in FIG. 1, referring to FIG. 2, FIG. 2 is a schematic flowchart of an ESIM card activation method according to an embodiment of the present invention. The method is jointly performed by a wireless router and a user terminal, and the wireless router and the user terminal each have a near field communication module. For details, refer to detailed descriptions of the following steps 101 to 105.

101: The user terminal obtains a configuration file used to activate an ESIM card of the wireless router.

Specifically, the user terminal obtains, by accessing a network, the configuration file used to activate the ESIM card of the wireless router. Optionally, the wireless router may establish a wireless network, denoted as a first wireless network in this embodiment of the present invention, and the first wireless network has a corresponding first name and a corresponding first password. However, a network accessed by the user terminal is not the first wireless network. The user terminal may access a network through, including but not limited to, any one of a second wireless network, a mobile data network with which the user terminal is registered, a Wi-Fi hotspot, and the like.

For example, the user terminal may send basic information of a user to an operator server through the accessed network, and the basic information of the user includes at least one of user identity information (such as an identity card number and a user name), a payment account (such as a bank card account or a credit card account of the user), and a selected service package (such as 10G traffic per month or another type). In this way, after verifying the basic information of the user, the operator server may feed back, to the user terminal, a configuration file used to activate an ESIM card.

Further, optionally, the configuration file used to activate the ESIM card may include but is not limited to a corresponding network protocol, a network access parameter, and the like.

Further, optionally, the user may install an application program on the user terminal to manage the wireless router, for example, implementing the steps in this embodiment of the present invention by using the application program.

102: The user terminal sends the configuration file to the wireless router by using the near field communication module.

Specifically, because the user terminal and the wireless router each have a near field communication module, the user terminal may send the obtained configuration file to the wireless router by using the module.

103: The wireless router receives, by using the near field communication module, a configuration file that is used to activate the ESIM card and that is sent by the user terminal.

104: The wireless router installs the configuration file to complete ESIM card activation.

Specifically, the wireless router receives the configuration file sent by the user terminal, and installs the configuration file, so that the wireless router can connect to the network based on a standard protocol, a network access parameter, and the like in the configuration file. For example, the configuration file that can be used to activate the ESIM includes the following information: an accessed network is a fifth-generation mobile telecommunications (5th-Generation, 5G) network, a selected operator is China Unicorn, a selected package is a 10G mobile data network package, and the like.

Optionally, the wireless router may install the configuration file by writing the configuration file to a storage space of the wireless router.

105: The wireless router establishes a first wireless network by using the activated ESIM card.

Specifically, after the wireless router activates the ESIM card, the wireless router can successfully access the network, and establish the first wireless network by enabling a wireless function such as the Wi-Fi function, so that any user terminal can access the network after successfully connecting to the first wireless network.

In this embodiment of the present invention, the wireless router receives, by using the near field communication module, the configuration file that is used to activate the ESIM card and that is sent by the user terminal; installs the configuration file to complete the ESIM card activation; and finally establishes the first wireless network by using the activated ESIM card. In this way, when the wireless router is unable to connect to a wireless network, the wireless router can receive, by using the near field communication module, the configuration file used to activate the ESIM card, and a user can activate the ESIM card of the wireless router in real time based on a requirement.

Figure 3:
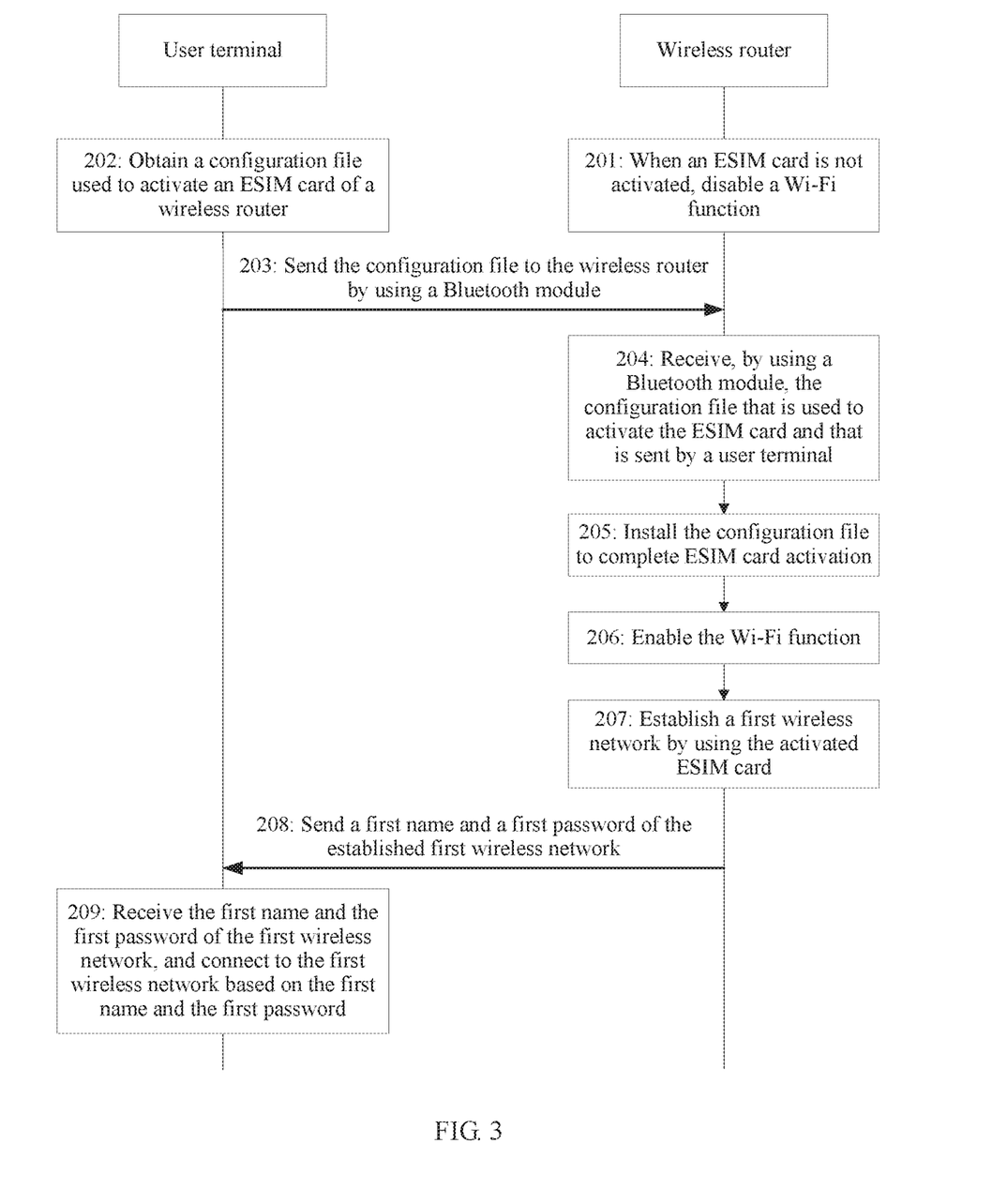
FIG. 3 is a schematic flowchart of an ESIM card activation method according to an embodiment of the present invention.

Referring to FIG. 3, FIG. 3 is a schematic flowchart of an ESIM card activation method according to an embodiment of the present invention. The method is jointly performed by a wireless router and a user terminal, and the wireless router and the user terminal each have a near field communication module. In this embodiment of the invention, a Bluetooth module is used as an example of the near field communication module for description. For details, refer to detailed descriptions of the following steps 201 to 209.

201: When an ESIM card of the wireless router is not activated, the wireless router disables a Wi-Fi function.

Specifically, when the ESIM card of the wireless router is not activated, the Wi-Fi function can be disabled for the ESIM card, so that the user terminal or another device does not establish a connection to the wireless router through an inactivated wireless network. Even if the connection is successfully established, the user terminal or the another device cannot successfully access a network.

Further, optionally, when the ESIM card of the wireless router is not activated, the Wi-Fi function is disabled, to avoid a case that a configuration file used to activate the ESIM card cannot be transmitted because the user terminal and the wireless router are connected through the inactivated wireless network.

202: The user terminal obtains a configuration file used to activate an embedded subscriber identification module ESIM card of the wireless router.

Specifically, the user terminal obtains, by accessing a network, the configuration file used to activate the ESIM card of the wireless router. Optionally, the wireless router may establish a wireless network, denoted as a first wireless network in this embodiment of the present invention, and the first wireless network has a corresponding first name and a corresponding first password. However, a network accessed by the user terminal is not the first wireless network, but the user terminal may access the network through, including but not limited to, any one of a second wireless network, a mobile data network with which the user terminal is registered, a Wi-Fi hotspot, and the like.

For example, the user terminal may send basic information of a user to an operator server through the accessed network, and the basic information of the user includes at least one of user identity information (such as an identity card number and a user name), a payment account (such as a bank card account or a credit card account of the user), and a selected service package (such as 10 G traffic per month or another type). In this way, after verifying the basic information of the user, the operator server may feed back, to the user terminal, a configuration file used to activate an ESIM card.

Further, optionally, the configuration file used to activate the ESIM card may include but is not limited to a corresponding network protocol, a network access parameter, and the like.

Further, optionally, the user may install an application program on the user terminal to manage the wireless router, for example, implementing the steps in this embodiment of the present invention by using the application program.

203: The user terminal sends the configuration file to the wireless router by using the Bluetooth module.

Specifically, because the user terminal and the wireless router each have a Bluetooth module, the user terminal may send the obtained configuration file to the wireless router by using the module.

Optionally, before the user terminal sends the configuration file, the user terminal and the wireless router establish a connection by using their respective Bluetooth modules, and the connection can be used to transmit data.

204: The wireless router receives, by using the Bluetooth module, the configuration file that is used to activate the ESIM card and that is sent by the user terminal.

205: The wireless router installs the configuration file to complete ESIM card activation.

Specifically, the wireless router receives the configuration file sent by the user terminal, and installs the configuration file, so that the wireless router can connect to the network based on a standard protocol, a network access parameter, and the like in the configuration file. For example, the configuration file that can be used to activate the ESIM includes the following information: an accessed network is a fifth-generation mobile telecommunications (5th-Generation, 5 G) network, a selected operator is China Unicorn, a selected package is a 10G mobile data network package, and the like.

Optionally, the wireless router may install the configuration file by writing the configuration file to a storage space of the wireless router.

206: The wireless router enables the Wi-Fi function.

Specifically, in this embodiment of the present invention, because the Wi-Fi function of the wireless router is disabled before the ESIM card of the wireless router is not activated, the Wi-Fi function of the wireless router is enabled after the ESIM card is activated.

It should be noted that in this embodiment of the present invention, step 201 and step 206 are optional steps, and the Wi-Fi function of the wireless router may be always in an enabled state, so that the Wi-Fi function does not need to be enabled after the ESIM card is activated.

Optionally, the wireless router may disable a Bluetooth function after the ESIM card is activated.

207: The wireless router establishes a first wireless network by using the activated ESIM card.

Specifically, after the wireless router activates the ESIM card, the wireless router can successfully access the network, and establish the first wireless network by enabling a wireless function such as the Wi-Fi function, so that any user terminal can access the network after successfully connecting to the first wireless network.

208: The wireless router sends a first name and a first password of the established first wireless network to the user terminal.

Specifically, the wireless router may send the first name and the first password of the first wireless network to the user terminal through the first wireless network, so that the user terminal can connect to the first wireless network by entering the first name and the first password. In this way, a user does not wed to query a name and a password of a wireless router, increasing intelligence of the wireless router.

Optionally, the first name and the first password of the first wireless network may be default information in factory settings of the wireless router. Alternatively, the first name and the first password of the first wireless network may be information randomly generated by the wireless router after the ESIM card is activated. In this case, the user terminal can obtain the access information and access the network only after the wireless router sends the information to the user terminal. This can better protect the first name and the first password of the first wireless network, and avoid random access of other terminals or devices.

209: The user terminal receives the first name and the first password of the first wireless network that are sent by the wireless router, and connects to the first wireless network based on the first name and the first password.

Specifically, the user terminal receives the first name and the first password of the first wireless network that are sent by the wireless router, and connects to the first wireless network based on the first name and the first password.

Optionally, the user terminal may modify the first name and the first password of the first network. For example, after the user terminal connects to the first wireless network based on the received first name and the first password, the user terminal modifies the first name and the first password of the first wireless network by managing an application program corresponding to the first network of the wireless router.

Optionally, if the user terminal connects to a network through a mobile data network before receiving the first name and the first password of the first wireless network that are sent by the wireless router, after the user terminal receives the first name and the first password of the first wireless network that are sent h the wireless router, and connects to the first wireless network based on the first name and the first password, the user terminal disconnects from the mobile data network. This increases intelligence and convenience of the user terminal, and can also avoid data traffic consumption caused when the user terminal uses the mobile data network for activation.

In this embodiment of the present invention, the wireless router receives, by using the near field communication module, the configuration file that is used to activate the ESIM card and that is sent by the user terminal; installs the configuration file to complete the ESIM card activation; and finally establishes the first wireless network by using the activated ESIM card. In this way, when the wireless router is unable to connect to a wireless network, the wireless router can receive, by using the near field communication module, the configuration file used to activate the ESIM card, and a user can activate the ESIM card of the wireless router in real time based on a requirement. In addition, the user terminal can receive the first name and the first password of the first wireless network that are sent by wireless router, so that intelligence of the wireless router is increased.

Figure 4:
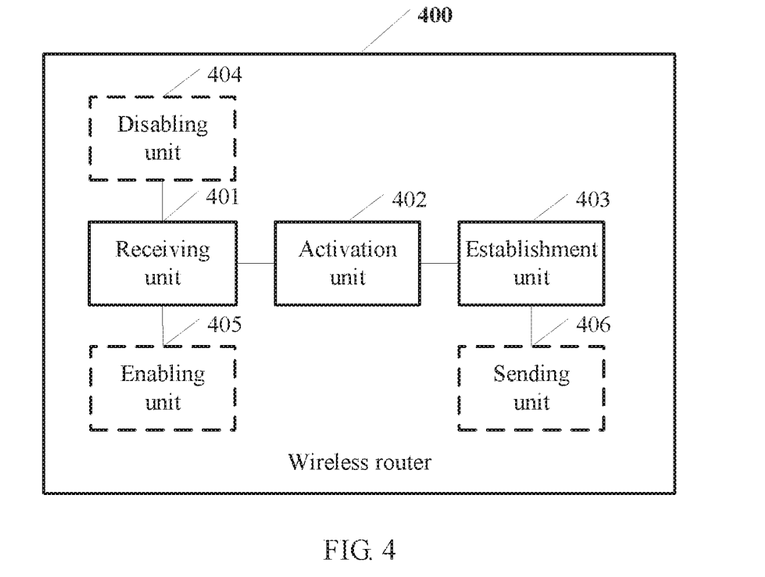
FIG. 4 is a schematic functional diagram of a wireless router according to an embodiment of the present invention.

FIG. 4 is a schematic functional diagram of the wireless router described in the foregoing embodiments. As shown in FIG. 4, the wireless router 400 may include a receiving unit 401, an activation unit 402, and an establishment unit 403. Optionally, the wireless router 400 may further include at least one of a disabling unit 404, an enabling unit 405, and a sending unit 406.

The receiving unit 401 is configured to receive, by using the near field communication module, a configuration file that is used to activate the ESIM card and that is sent by a user terminal.

The activation unit 402 is configured to install the configuration file to complete ESIM card activation.

The establishment unit 403 is configured to establish a first wireless network by using the activated ESIM card.

In an optional embodiment, the wireless router 400 further includes:
 a disabling unit 404, configured to disable a Wireless Fidelity Wi-Fi function when the ESIM card of the wireless router is not activated.

In an optional embodiment, the wireless router 400 further includes:
 an enabling unit 405, configured to enable, by using the near field communication module, a near field communication function when the ESIM card of the wireless router is not activated.

In an optional embodiment, the establishment unit 403 is specifically configured to: when the ESIM card of the wireless router is activated, enable the function, and establish the first wireless network by using the activated ESIM card.

In an optional embodiment, the wireless router 400 further includes:
 a sending unit 406, configured to send a first name and a first password of the established first wireless network to the user terminal.

It can be understood that for specific implementations of functional modules included in the wireless router 400 in FIG. 4 and corresponding beneficial effects, reference may be made to the foregoing embodiments. Details are not described herein again.

Figure 5:
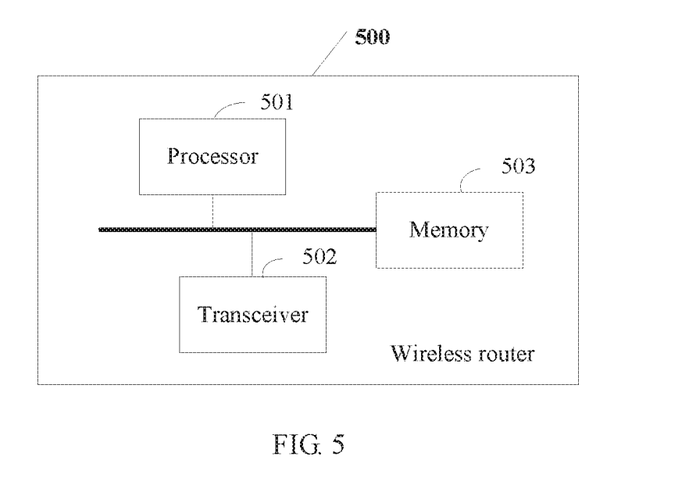
FIG. 5 is a schematic structural diagram of another wireless router according to an embodiment of the present invention.

The wireless router 400 in the embodiment shown in FIG. 4 may be implemented by a wireless router 500 shown in FIG. 5. As shown in FIG. 5, FIG. 5 is a schematic structural diagram of another wireless router according to an embodiment of the present invention. The wireless router 500 shown in FIG. 5 includes a processor 501 and a transceiver 502. The transceiver 502 is configured to support data transmission between the wireless router 500 and the user terminal in the foregoing embodiments or another terminal device. The transceiver 502 may be implemented by using a near field communication module, or the transceiver may be implemented by using a module. The processor 501 and the transceiver 502 are communicatively connected, for example, by using a bus. The wireless router 500 may further include a memory 503. The memory 503 is configured to store program code and data to be executed by the wireless router 500, to implement the actions of the wireless router provided in either of the embodiments shown in FIG. 2 and FIG. 3.

The processor 501 is applied to this embodiment of the present invention, and is configured to implement functions of the activation unit 402, the establishment unit 403, the enabling unit 405, and the disabling unit 404 shown in FIG. 4. The transceiver 502 is applied to this embodiment of the present invention, and is configured to implement functions of the receiving unit 401 and the sending unit 406 shown in FIG. 5.

The processor 501 may be a central processing unit (English: central processing unit, CPU), a network processor (English: network processor, NP), a hardware chip, or a combination thereof. The hardware chip may be an application-specific integrated circuit (English: application-specific integrated circuit, ASIC), a programmable logic device (English: programmable logic device. PLD), or a combination thereof. The PLD may be a complex programmable logic device (English: complex programmable logic device, CPLD), a field-programmable logic gate array (English: field-programmable gate array, FPGA), a generic array logic (English: generic array logic, GAL), or any combination thereof.

The memory 503 may include a volatile memory (English: volatile memory) such as a random access memory (English: random access memory, RAM); or the memory 503 may include a non-volatile memory (English: non-volatile memory) such as a read-only memory (English: read-only memory, ROM), a flash memory (English: flash memory), a hard disk drive (English: hard disk drive, HDD), or a solid-state drive (English: solid-state drive, SSD); or the memory 503 may include a combination of the foregoing types of memories.

An embodiment of the present invention further provides a computer storage medium, configured to store a computer software instruction used by the foregoing wireless router. The computer software instruction includes a program that is designed for the wireless router to perform the foregoing embodiments. The storage medium includes; but is not limited to, a flash memory, a hard disk, and a solid state disk.

An embodiment of the present invention further provides a computer program product. When the computer product is executed by a computing device, the ESIM card activation method designed for the wireless router in the foregoing embodiments is performed.

Figure 6:
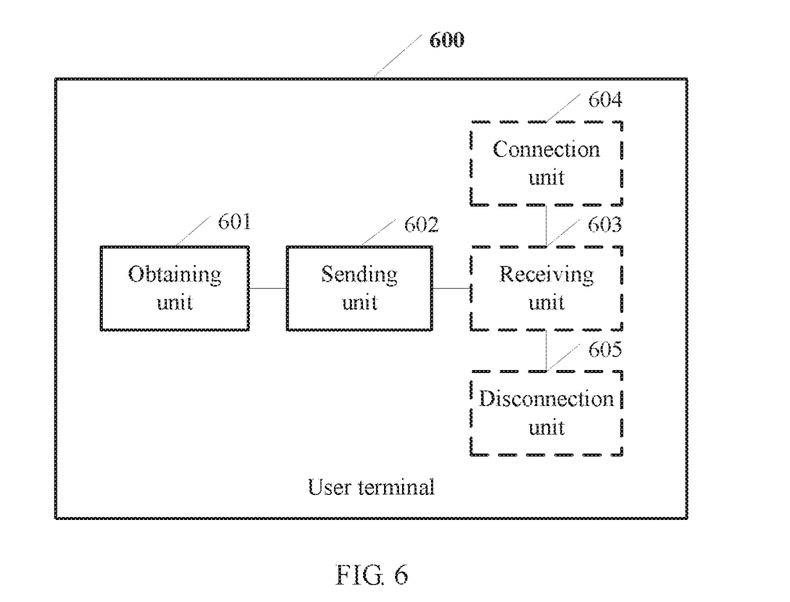
FIG. 6 is a schematic functional diagram of a user terminal according to an embodiment of the present invention.

FIG. 6 is a schematic functional diagram of the user terminal described in the foregoing embodiments. As shown in FIG. 6, the user terminal 600 may include an obtaining unit 601 and a sending unit 602. Optionally, the user terminal 600 may further include at least one of a receiving unit 603, a connection unit 604, and a disconnection unit 605.

The obtaining unit 601 is configured to obtain a configuration file used to activate an ESIM card of a wireless router.

The sending unit 602 is configured to send the configuration file to the wireless router by using the near field communication module.

In an optional embodiment, the obtaining unit 601 is specifically configured to download, through a second wireless network or a mobile data network, the configuration file used to activate the ESIM card of the wireless router.

In an optional embodiment, the user terminal 600 further includes:
 a receiving unit 603, configured to receive a first name and a first password of a first wireless network that are sent by the wireless router; and
 a connection unit 604, configured to connect to the first wireless network based on the first name and the first password.

In an optional embodiment, if the receiving unit 603 connects to a network through the mobile data network before receiving the first name and the first password of the first wireless network that are sent by the wireless router, the user terminal further includes:

a disconnection unit 605, configured to disconnect from the mobile data network.

It can be understood that for specific implementations of functional modules included in the user terminal 600 in FIG. 6; reference may be made to the foregoing embodiments. Details are not described herein again.

Figure 7:
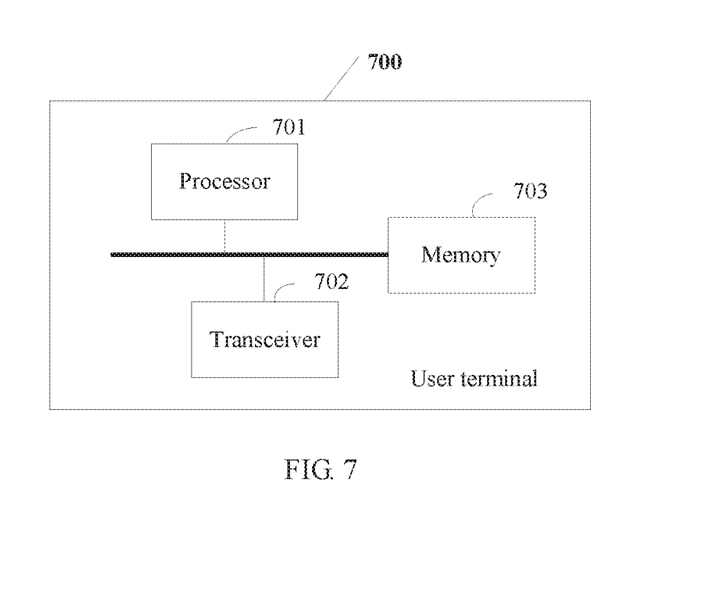
FIG. 7 is a schematic structural diagram of another user terminal according to an embodiment of the present invention.

The user terminal 600 in the embodiment shown in FIG. 6 may be implemented by a user terminal 700 shown in FIG. 7. As shown in FIG. 7, FIG. 7 is a schematic structural diagram of another user terminal according to an embodiment of the present invention. The user terminal 700 shown in FIG. 7 includes a processor 701 and a transceiver 702. The transceiver 702 is configured to support data transmission between the user terminal 700 and the wireless router in the foregoing embodiments or another terminal device. The transceiver 502 may be implemented by using a near field communication module, or the transceiver may be implemented by using a module. The processor 701 and the transceiver 702 are communicatively connected, for example, by using a bus. The user terminal 700 may further include a memory 703. The memory 703 is configured to store program code and data to be executed by the user terminal 700, to implement the actions of the user terminal provided in either of the embodiments shown in FIG. 2 and FIG. 3.

The processor 701 is applied to this embodiment of the present invention, and is configured to implement functions of the obtaining unit 601; the connection unit 604, and the disconnection unit 605 shown in FIG. 6. The transceiver 702 is applied to this embodiment of the present invention, and is configured to implement functions of the sending unit 602 and the receiving unit 603 shown in FIG. 7.

The processor 701 may be a CPU, an NP, a hardware chip, or any combination thereof. The hardware chip may be an ASIC, a PLD, or a combination thereof. The PLD may be a CPLD, an FPGA, a GAL, or any combination thereof.

The memory 703 may include a volatile memory such as a RAM; or the memory 703 may include a nonvolatile memory such as a ROM, a flash memory, an HDD, or an SSD; or the memory 703 may include a combination of the foregoing types of memories.

An embodiment of the present invention further provides a computer storage medium, configured to store a computer software instruction used by the foregoing user terminal. The computer software instruction includes a program that is designed for the user terminal to perform the foregoing embodiments. The storage medium includes, but is not limited to, a flash memory, a hard disk, and a solid state disk.

An embodiment of the present invention further provides a computer program product. When the computer product is executed by a computing device, the ESIM card activation method designed for the user terminal in the foregoing embodiments is performed.

In the specification, claims, and accompanying drawings of this application, the terms "first", "second", "third", "fourth" and so on are intended to distinguish between different objects but do not indicate a particular order. In addition, the terms "including", "containing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

To make a person skilled in the art understand the technical solutions in this application better, the following describes the technical solutions in the embodiments of this application with reference to the accompanying drawings in the embodiments of this application. In the specification, claims, and accompanying drawings of this application, the terms "first", "second", "third", "fourth" and so on are intended to distinguish between different objects but do not indicate a particular order. In addition, the terms "including", "containing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person skilled in the art should understand that the embodiments of this application may be provided as a method, an apparatus (device), or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another allocation form, such as by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondindy, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An embedded subscriber identification module (ESIM) card activation method implemented by a wireless router that comprises near field communication technology and that supports the ESIM card, wherein the ESIM card activation method comprises:
   disabling a Wi-Fi function of the wireless router while the ESIM card of the wireless router is not activated;
   receiving, using the near field communication technology and from a user terminal, a configuration file configured to activate the ESIM card of the wireless router, wherein the ESIM card is activated in real-time, and wherein the configuration file comprises a network protocol configuration and a network access parameter;
   installing the configuration file to complete activation of the ESIM card;
   enabling the Wi-Fi function after the activation of the ESIM card;
   establishing a first wireless network using the activated ESIM card after the Wi-Fi function is enabled; and
   sending a first name and a first password of the first wireless network to the user terminal through the first wireless network in order to enable the user terminal to establish a connection in the first wireless network based on the first name and the first password.

2. The ESIM card activation method of claim 1, further comprising enabling a near field communication function using the near field communication technology when the ESIM card of the wireless router is not activated.

3. An embedded subscriber identification module (ESIM) card activation method implemented by a user terminal that comprises a near field communication technology, wherein the ESIM card activation method comprises:
   obtaining a configuration file configured to activate an ESIM card of a wireless router, wherein the ESIM card is activated in real-time, wherein a Wi-Fi function of the wireless router is enabled in response to the ESIM card being activated, and wherein the configuration file comprises a network protocol configuration and a network access parameter;
   sending the configuration file to the wireless router using the near field communication technology to activate the ESIM card of the wireless router and to enable the wireless router to establish a first wireless network using the Wi-Fi function;
   receiving a first name and a first password of the first wireless network from the wireless router through the first wireless network; and
   connecting to the first wireless network based on the first name and the first password.

4. The ESIM card activation method of claim 3, wherein the obtaining the configuration file comprises downloading the configuration file using a second wireless network.

5. The ESIM card activation method of claim 3, wherein when the user terminal connects to a network using a mobile data network before receiving the first name and the first password of the first wireless network, the ESIM card activation method further comprises:
   disconnecting from the mobile data network after the receiving the first name and the first password of the first wireless network from the wireless router; and
   connecting to the first wireless network based on the first name and the first password.

6. A wireless router that supports an embedded subscriber identification module (ESIM) card, wherein the wireless router comprises:
   a transceiver;
   a processor coupled to the transceiver and configured to:
      disable a Wi-Fi function of the wireless router while the ESIM card of the wireless router is not activated;
      control the transceiver to receive, from a user terminal, a configuration file configured to activate the ESIM card of the wireless router, wherein the ESIM card is activated in real-time, and wherein the configuration file comprises a network protocol configuration and a network access parameter;
      install the configuration file to complete activation of the ESIM card;
      enable the Wi-Fi function after activation of the ESIM card is completed;
      establish a first wireless network using the ESIM card when the ESIM card is activated and the Wi-Fi function is enabled; and
      send a first name and a first password of the first wireless network to the user terminal through the first wireless network in order to enable the user terminal to establish a connection in the first wireless network based on the first name and the first password.

7. The wireless router of claim 6, wherein the processor is further configured to enable a near field communication function when the ESIM card is not activated.

8. A user terminal comprising:
   a near field communication technology; and
   a processor coupled to the near field communication technology and configured to:
      control the near field communication technology to obtain a configuration file configured to activate an embedded subscriber identification module (ESIM) card of a wireless router, wherein the ESIM card is activated in real-time, wherein a Wi-Fi function of the wireless router is enabled in response to the ESIM card being activated, and wherein the configuration file comprises a network protocol configuration and a network access parameter;

control the near field communication technology to send the configuration file to the wireless router using the near field communication technology to activate the ESIM card of the wireless router and to enable the wireless router to establish a first wireless network using the Wi-Fi function;

receive a first name and a first password of the first wireless network from the wireless router through the first wireless network; and connect to the first wireless network based on the first name and the first password.

9. The user terminal of claim 8, wherein the processor is configured to control the user terminal to download the configuration file using a second wireless network or a mobile data network.

10. The user terminal of claim 8, wherein when the user terminal connects to a network using a mobile data network before the user terminal receives the first name and the first password of the first wireless network from the wireless router, the processor is further configured to cause the user terminal to disconnect from the mobile data network.

11. The method of claim 4, wherein the obtaining the configuration file comprises downloading the configuration file using the second wireless network.

12. The method of claim 4, wherein the obtaining the configuration file comprises downloading the configuration file using a mobile data network.

13. The user terminal of claim 9, wherein the processor is configured to control the user terminal to download the configuration file using the second wireless network.

14. The user terminal of claim 9, wherein the processor is configured to control the user terminal to download the configuration file using the mobile data network.

15. The user terminal of claim 8, wherein the near field communication technology comprises a BLUETOOTH technology.

16. The ESIM card activation method of claim 1, wherein a user activates the ESIM card of the wireless router in the real time based on a requirement.

17. The user terminal of claim 8, wherein the processor is configured to modify the first name and the first password of the first wireless network by managing an application program corresponding to the first network of the wireless router.

18. The user terminal of claim 8, wherein a user activates the ESIM card of the wireless router in the real time based on a requirement.

19. The ESIM card activation method of claim 3, further comprising modifying the first name and the first password of the first wireless network by managing an application program corresponding to the first network of the wireless router.

20. The ESIM card activation method of claim 3, wherein a user activates the ESIM card of the wireless router in the real time based on a requirement.

* * * * *